United States Patent
Gormley

(10) Patent No.: US 8,824,971 B2
(45) Date of Patent: Sep. 2, 2014

(54) SYSTEMS AND METHODS FOR DYNAMIC TEMPERATURE CALIBRATION OF A FREQUENCY REFERENCE

(75) Inventor: Eamonn Gormley, Redmond, WA (US)

(73) Assignee: Eden Rock Communications, LLC, Bothell, WA (US)

(*) Notice: Subject to any disclaimer, the term of this patent is extended or adjusted under 35 U.S.C. 154(b) by 442 days.

(21) Appl. No.: 12/711,895

(22) Filed: Feb. 24, 2010

(65) Prior Publication Data

US 2010/0216407 A1    Aug. 26, 2010

Related U.S. Application Data

(60) Provisional application No. 61/155,122, filed on Feb. 24, 2009.

(51) Int. Cl.
    *H04B 17/00* (2006.01)
(52) U.S. Cl.
    CPC ........ *H04B 17/0015* (2013.01); *H04B 17/0037* (2013.01)
    USPC ....................................... 455/67.11
(58) Field of Classification Search
    None
    See application file for complete search history.

(56) References Cited

U.S. PATENT DOCUMENTS

| | | | |
|---|---|---|---|
| 4,513,259 A | 4/1985 | Frerking | |
| 5,172,075 A | 12/1992 | Yerbury et al. | |
| 7,139,530 B2 * | 11/2006 | Kusbel | 455/67.11 |
| 2002/0173284 A1 * | 11/2002 | Forrester | 455/255 |
| 2004/0253927 A1 * | 12/2004 | Qiu | 455/67.13 |
| 2007/0153944 A1 | 7/2007 | Kerstenbeck et al. | |
| 2008/0143454 A1 | 6/2008 | McCorquodale et al. | |
| 2008/0316996 A1 * | 12/2008 | Hatala | 370/350 |
| 2011/0161701 A1 * | 6/2011 | Blixt et al. | 713/320 |

OTHER PUBLICATIONS

International Search Report and Written Opinion for PCT/US2010/025236 filed on Feb. 24, 2010.

* cited by examiner

*Primary Examiner* — Nay A Maung
*Assistant Examiner* — Alejandro Rivero

(57) ABSTRACT

A system and method are described for dynamic temperature calibration of a frequency reference in a wireless base station. In a consumer grade base station, a reference oscillator may encounter frequency drift as the temperature of the base station changes. This causes interference as the transmission signal is not synchronized with other frequency resources in a network. An improved method of calibrating a reference frequency includes measuring a frequency difference between a frequency derived from an accurate reference frequency in a first base station and a frequency derived from a less accurate frequency reference in a second base station, determining a calibration factor for the offset, and applying the calibration factor to the base station to correct frequency drift. The calibration factors may be correlated with an operating temperature of the base station and stored in a temperature calibration table in the base station device.

21 Claims, 9 Drawing Sheets

SYSTEMS AND METHODS FOR DYNAMIC TEMPERATURE CALIBRATION OF A FREQUENCY REFERENCE

CROSS REFERENCE TO RELATED APPLICATIONS

The present application claims the benefit of U.S. Provisional Application No. 61/155,122, filed Feb. 24, 2009.

FIELD OF THE INVENTION

The field of the present invention generally relates to systems and methods for dynamic temperature calibration of a frequency reference. The dynamic temperature calibration is used to correct a frequency drift of an oscillator and to generate timing signals in a wireless base station such as a femtocell base station.

BACKGROUND OF THE INVENTION

In cellular networks, radio base stations must use a very accurate frequency reference for their RF transmit and receive circuitry and other components. In order to achieve the required degree of accuracy, which is typically on the order of 0.05 parts per million (ppm), this reference may require specialized hardware. Various schemes for generating an accurate frequency reference include synchronizing with an atomic clock, using a frequency derived from a dedicated backhaul connection (e.g., deriving a frequency reference from a T1, E1, or fiber optic cable that uses a Stratum-1 clock as a reference), or using a frequency reference provided by a Global Positioning System (GPS) receiver. These reference schemes are practical in larger base stations where cost sensitivity is low and a fixed line backhaul is standard.

A new type of base station providing personalized coverage has become attractive to some carriers for subscribers' homes and small offices rather than covering large districts of urban or sub-urban areas. These new base stations are known as femtocells, and are characterized by much smaller coverage areas, consumer-grade packaging and price-points, and the use of consumer internet protocol (IP) connections using various common wireline technologies. These wireline technologies, may include, but are not limited to: DSL, DOCSIS, powerline, and/or coaxial cable. The lack of a fixed line backhaul and extreme cost sensitivity of these femtocells require different synchronization schemes than larger cells use. Additionally, traditional GPS synchronization may not work with femtocells as they are typically installed indoors where a GPS receiver cannot receive a signal from the GPS satellite system that is required to provide the high accuracy frequency reference.

To meet the price point targets of femtocell base stations, traditional reference schemes cannot be implemented. Accordingly, femtocells may use a less precise oscillator which sacrifices accuracy and precision for cost. These low-cost oscillators encounter frequency drift a result of manufacturing variations or environmental factors such as temperature, humidity, or the age of the oscillator.

As a reference frequency generated by an oscillator drifts, the base station may begin to transmit outside of an allocated frequency range. This may raise an interference level (e.g., a signal-to-interference-plus-noise (SINR) level) among frequency resources which are shared by adjacent cells (e.g., base stations) in a network, affecting a service provider network's Quality of Service (QOS) as well as network service subscribers' collective Quality of Experience (QOE) within a particular portion of a data communications network. Negative effects associated with poor QOS and poor QOE (e.g., conditions largely caused by congestion and/or interference), which can be exacerbated by adding uncalibrated short-range wireless transceiver devices to a network infrastructure, may include: queuing delay, data loss, as well as blocking of new and existing network connections for certain network subscribers.

Additionally, it may take more time to arrive at an accurate reference frequency on start-up using a less precise oscillator in a short-range or femtocell base station. Thus, it would be advantageous for any calibration systems and methods to improve a base station's startup procedures in terms of synchronizing with a network frequency.

Presently, there is a need for improved systems and methods that facilitate reference frequency calibration in a low-cost base station. It would be beneficial if the calibration can be used to improve the accuracy and precision of a low-cost oscillator in order to provide a frequency generation system that is economically feasible in a femtocell base station. It would further be beneficial if the calibration improves a start-up of the base station.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with frequency reference timing systems in short-range base stations, a self-optimizing base station includes systems and methods for dynamic calibration of a frequency reference.

The present invention may include a transceiver device, comprising: one or more processors; a memory storing a calibration table; a frequency reference; a temperature sensor; and a data communications component, wherein the transceiver device is configured to: receive a reference correction feedback from a network controller device; measure a current operating temperature with the temperature sensor; and update the calibration table using both data related to the reference correction feedback as well as calibration table data associated with the current operating temperature.

In accordance with another aspect of the present invention, the reference correction feedback relates to an offset measurement determined by taking the difference between a measured frequency derived from the frequency reference and a measured frequency derived from a more accurate frequency reference.

In accordance with another aspect of the present invention, the process of updating the calibration table further comprises converting the reference correction feedback into a data format consistent with a data format associated with data stored in the calibration table.

In accordance with another aspect of the present invention, the process of updating the calibration table further comprises reading data from the calibration table associated with the current operating temperature and then combining the read calibration table data with the converted reference correction feedback data.

In accordance with another aspect of the present invention, the process of updating the calibration table further comprises storing the combined data in the calibration table.

In accordance with another aspect of the present invention, the frequency reference and the temperature sensor are collocated within the transceiver device, such that the operating temperature of the frequency source is accurately determined by the temperature sensor.

In accordance with another aspect of the present invention, the updated calibration table is utilized by the transceiver device to correct the frequency reference at a particular operating temperature measured by the temperature sensor.

The present invention may further include a computer-readable medium encoded with computer-executable instructions for updating a calibration table within a transceiver device, which when executed, performs the method comprising: receiving a reference correction feedback from a network controller device; measuring a current operating temperature of a frequency reference of the transceiver device with a resident temperature sensor; and updating the calibration table using both data related to the reference correction feedback as well as calibration table data associated with the current operating temperature.

In accordance with another aspect of the present invention, the process of updating the calibration table further comprises: reading data from the calibration table associated with the current operating temperature; combining the read calibration table data with the converted reference correction feedback data; and storing the combined data in the calibration table.

In accordance with another aspect of the present invention, the process of receiving a reference correction feedback is performed at a predetermined interval throughout an operation of the transceiver device.

The present invention may further include a computer-implemented method for updating a calibration table within a transceiver device, the method comprising: receiving a reference correction feedback from a network controller device; measuring a current operating temperature of a frequency reference of the transceiver device with a resident temperature sensor; and updating the calibration table using both data related to the reference correction feedback as well as calibration table data associated with the current operating temperature.

BRIEF DESCRIPTION OF THE DRAWINGS

Preferred and alternative examples of the present invention are described in detail below by way of example and with reference to the drawings, in which.

DETAILED DESCRIPTION

Figure 1:
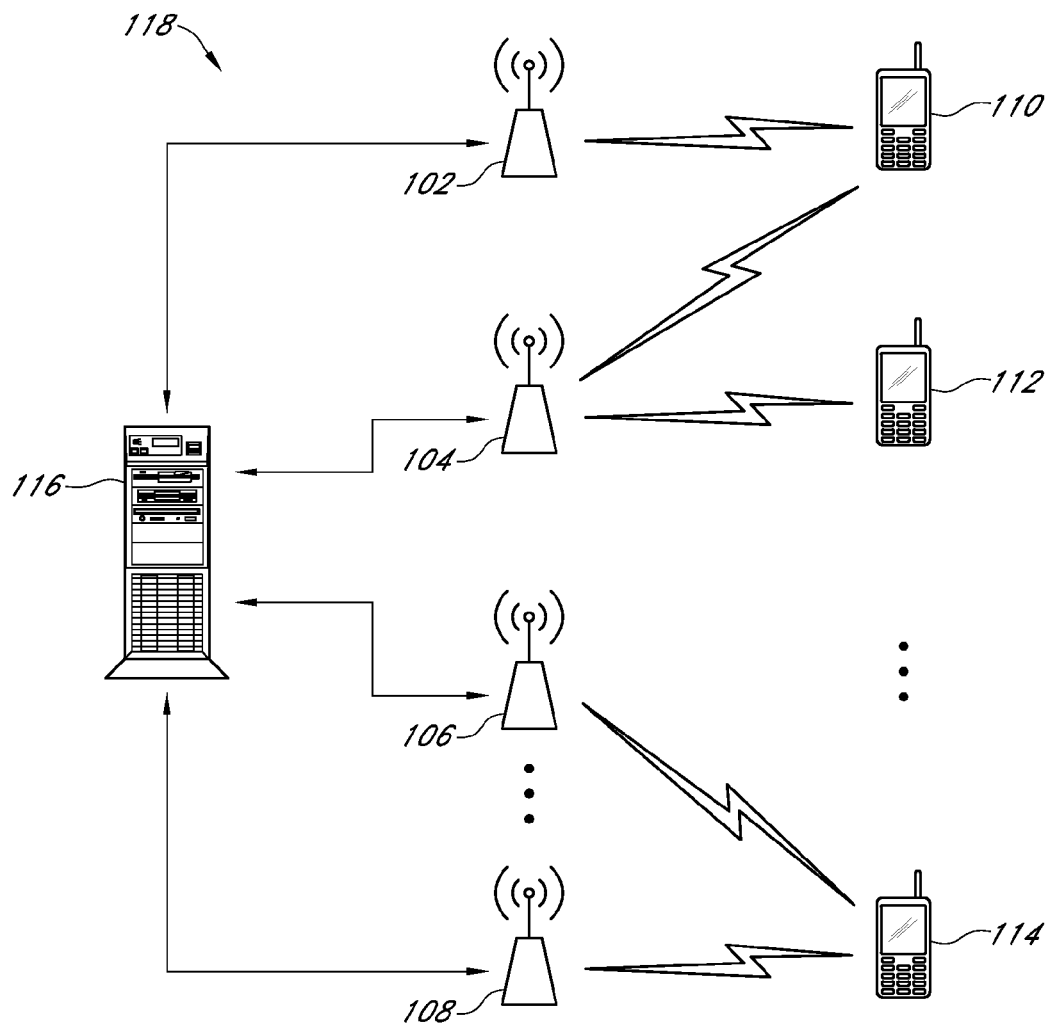
FIG. 1 illustrates a perspective view of a networked computing system in accordance with an embodiment of the present invention.

In accordance with an exemplary embodiment of the present invention, FIG. 1 illustrates a perspective view of a networked computing system 118 in accordance with an embodiment of the present invention. Generally, networked computing system 118 comprises a variety of base station devices (e.g., 102, 104, 106 and 108), user equipment (e.g., 110, 112, and 114), and a radio resource manager (RRM) 116. FIG. 1 illustrates but one example of a network topology, and any number of base stations (which may be referred to generically as "transceiver devices"), user equipment, and RRMs may be used as is known in the Art.

In accordance with various embodiments of the present invention, base station 102 may be considered to be any of a macrocell, a microcell, or a picocell base station, depending on the reference coverage area provided by the small-area or short-range wireless base station device(s) (e.g., a femtocell or a picocell device) to which the base station coverage area is being compared. Similarly, in accordance with various embodiments of the present invention, a small-area or short-range wireless base station (e.g., 104, 106, and 108) may be considered to be either a femtocell (e.g., a short-range base station device such as a Home eNodeB) or a picocell device, depending on the reference coverage area provided by neighboring wider coverage area base stations (e.g., macrocell, microcell, or picocell base stations) to which the base station coverage area is being compared.

In an embodiment, base station devices (e.g., 102, 104, 106, and 108) may have overlapping coverage areas depending on the coverage area of the particular base station as well as its proximity to neighboring devices. User equipment (e.g., 110, 112, and 114) may reside in one or many coverage areas associated with the base stations and may communicate with multiple base stations as shown in FIG. 1.

In an embodiment, the base station devices (e.g., 102, 104, 106 and 108), user equipment (e.g., 110, 112, and 114), and RRM 116 may be configured to run any well-known operating system, including, but not limited to: Microsoft® Windows®, Mac OS®, Google® Chrome®, Linux®, Unix®, or any well-known mobile operating system, including Symbian®, Palm®, Windows Mobile®, Google® Android®, Mobile Linux®, MXI®, etc. In an embodiment, the base station 102 (e.g., a macrocell base station) may employ any number of common server, desktop, laptop, and personal computing devices.

In an embodiment, the user equipment (e.g., 110, 112, and 114) may include any combination of common mobile computing devices (e.g., laptop computers, netbook computers, cellular phones, PDAs, handheld gaming units, electronic book devices, personal music players, MiFi™ devices, video recorders, etc.), having wireless communications capabilities employing any common wireless data commutations technology, including, but not limited to: GSM™, UMTS™, LTE™, LTE Advanced™, Wi-Max™, Wi-F™, etc.

In an embodiment, the base station devices (e.g., 102, 104, 106 and 108), user equipment (e.g., 110, 112, and 114), and RRM 116 may communicate using any data communication network, including but not limited to, a wide area network (WAN) or a local area network (LAN). Either of the LAN or WAN portions of the networked computing system 118 may employ, but is not limited to, any of the following communications technologies: optical fiber, coaxial cable, twisted pair cable, Ethernet cable, and powerline cable, along with any wireless communication technology known in the art. In an embodiment, the base station devices (e.g., 102, 104, 106, and 108) may communicate amongst themselves using an X2 interface consistent with a LTE implementation while the base stations may further communicate with the RRM 116 using an S1 connection as defined in the LTE specification.

In an embodiment, the base station devices (e.g., 102, 104, 106 and 108), user equipment (e.g., 110, 112, and 114), and RRM 116 may include any standard computing software and hardware necessary for processing, storing, and communicating data amongst each other within the networked computing system 118. The computing hardware realized by any of the network computing system 118 devices (e.g., 102, 104, 106, 108, 110, 112, 114, and 116) may include, but is not limited to: one or more processors, volatile and non-volatile memories, user interfaces, transcoders, modems, and wireline and/or wireless communications transceivers, etc.

Further, any of the networked computing system 118 devices (e.g., 102, 104, 106, 108, 110, 112, 114, and 116) may be configured to include one or more computer-readable media (e.g., any common volatile or non-volatile memory type) encoded with a set of computer readable instructions, which when executed, performs a portion of any of the processes for dynamic temperature calibration of a frequency resource in association with various embodiments of the present invention.

In one embodiment, base station hardware is dependent on the implementation in the networked computing system 118. For example, a macrocell base station 102 may include a highly accurate time reference system such as GPS, an atomic clock, or a fixed network connection deriving a frequency reference from a Stratum-1 clock. Alternatively, a femtocell base station (e.g., 104, 106, and 108) may have a less precise frequency reference such as a voltage controlled oscillator or a fixed frequency oscillator. In one embodiment, a femtocell base station may dynamically calibrate a frequency reference in conjunction with frequency difference feedback from user equipment in accordance with the present invention.

Further, the radio resource manager (RRM) 116 may coordinate a calibration process in accordance with an embodiment of the invention. In one embodiment, RRM 116 is a separate computer such as a server, while in another embodiment the RRM 116 is incorporated into a base station device (e.g., 102, 104, 106, and 108). Further, RRM 116 may employ any number of common server, desktop, laptop, and personal computing devices. RRM 116 is configured to receive and process information from wireless base stations (e.g., 102, 104, 106, and 108) through the networked computing system 118.

Figure 2:
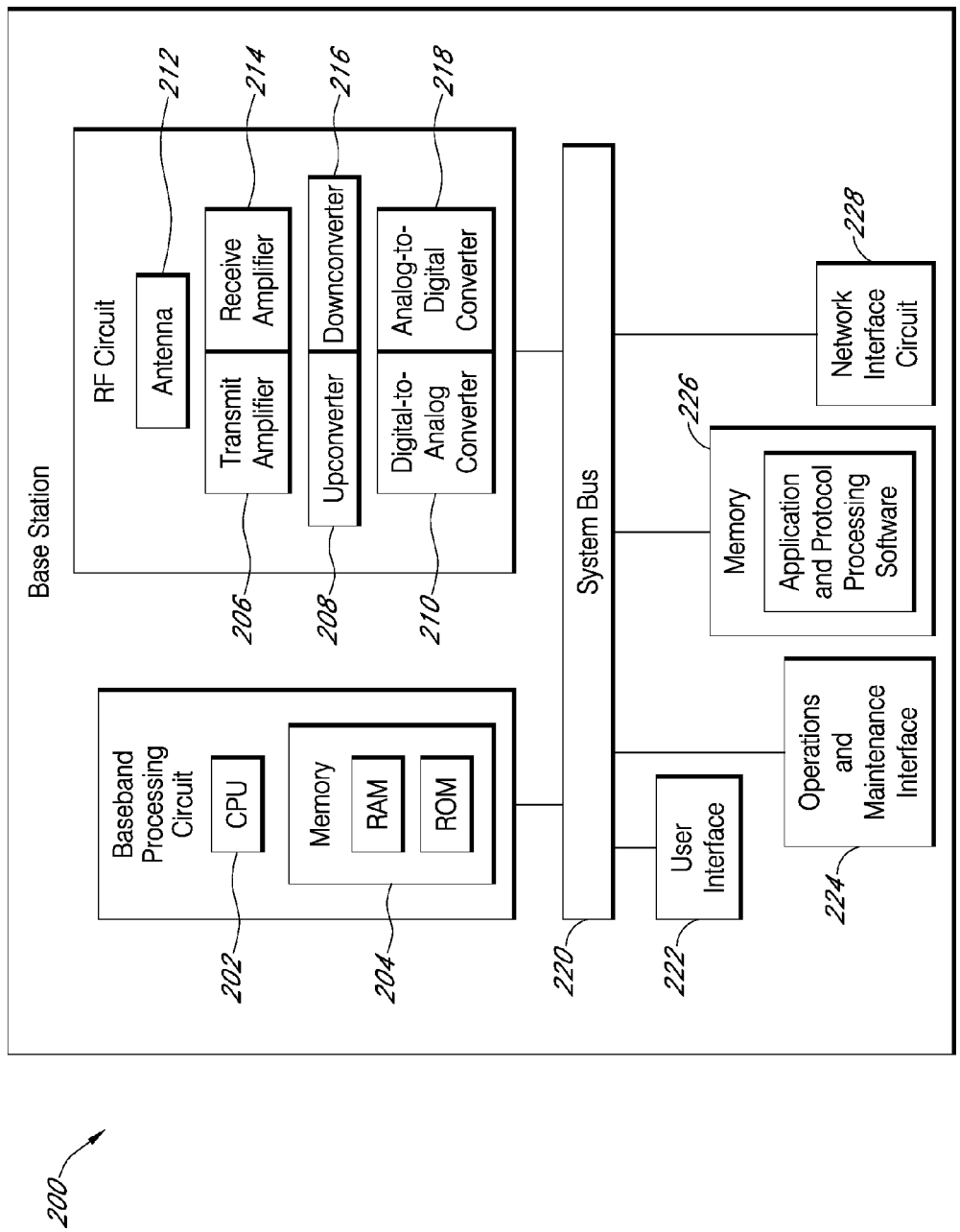
FIG. 2 illustrates a block diagram view of a base station in accordance with an embodiment of the present invention.

FIG. 2 illustrates a block diagram view of a base station device 200 (e.g., a femtocell or a picocell device) that may be representative of the base stations (e.g., 104, 106, and 108) in FIG. 1. In accordance with an embodiment of the present invention, the base station device 200 may include, but is not limited to, a baseband processing circuit including at least one central processing unit (CPU) 202. In an embodiment, the CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing all computer programs stored on the base station's 200 volatile (RAM) and nonvolatile (ROM) system memories, 204 and 226.

The base station device 200 may also include, but is not limited to, a radio frequency (RF) circuit for transmitting and receiving data to and from the network. The RF circuit may include, but is not limited to, a transmit path including a digital-to-analog converter 210 for converting digital signals from the system bus 220 into analog signals to be transmitted, an upconverter 208 for setting the frequency of the analog signal, and a transmit amplifier 206 for amplifying analog signals to be sent to the antenna 212. In one embodiment, upconverter 208 may include a modulation unit containing a frequency reference, errors in which may be corrected for based on an ambient operating temperature. Further, the RF circuit may also include, but is not limited to, a receive path including the receive amplifier 214 for amplifying the signals received by the antenna 212, a downconverter 216 for downconverting the received signals to a baseband frequency, and an analog-to-digital converter 218 for outputting the received signals onto the system bus 220. The system bus 220 facilitates data communication amongst all the hardware resources of the base station device 200.

Further, the base station device 200 may also include, but is not limited to, a user interface 222; operations and maintenance interface 224; memory 226 storing application and protocol processing software; and a network interface circuit 228 facilitating communication across the LAN and/or WAN portions of the data communications network 118 (i.e., a backhaul network).

Figure 3:
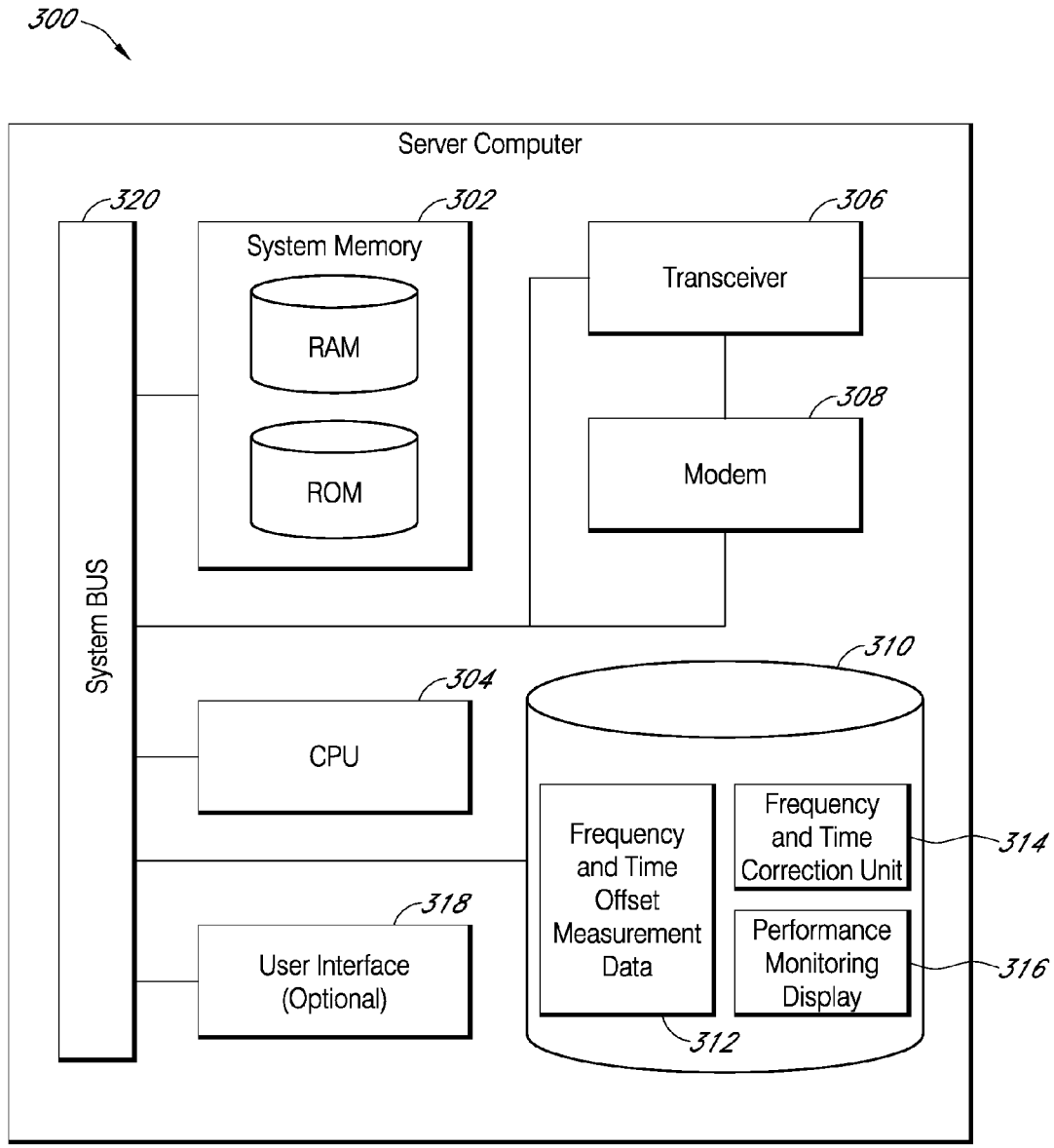
FIG. 3 illustrates a block diagram view of a server computer in accordance with an embodiment of the present invention.

FIG. 3 illustrates a block diagram view of a server computer 300 that may be representative of radio resource manager 116 in FIG. 1 or any other common network device known in the art such as a router, gateway, or switch device. The server computer 300 may include, but is not limited to, one or more processor devices including a central processing unit (CPU) 304. In an embodiment, the CPU 304 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 304 is responsible for executing all computer programs stored on the server computer's 300 volatile (RAM), nonvolatile (ROM), and long-term storage system memories, 302 and 310.

The server computer 300 may also include, but is not limited to, an optional user interface 318 that allows a server administrator to interact with the server computer's 300 software and hardware resources; a software/database repository 310 including: frequency and time offset measurements 312 that may include a listing of registered base station devices (e.g., any of 102, 104, 106, 108, and 200) and the type of frequency reference associated with a registered base station device; frequency and time correction unit 314 that analyzes the frequency and time offset measurements 312 and generates frequency correction instructions to a base station (e.g., 104, 106, and 108); and a performance monitoring display 316 for displaying to administrators at a network operations center, for example, the performance and operation of the networked computing system 118. Further, the server computer 300 may also include a modem 308 for formatting data communications prior to transfer; a transceiver 306 for transmitting and receiving network communications amongst various network base stations, user equipment, and computing devices utilizing the data communication network of the networked computing system 118; and a system bus 320 that facilitates data communications amongst all the hardware resources of the server computer 300.

Figure 4:
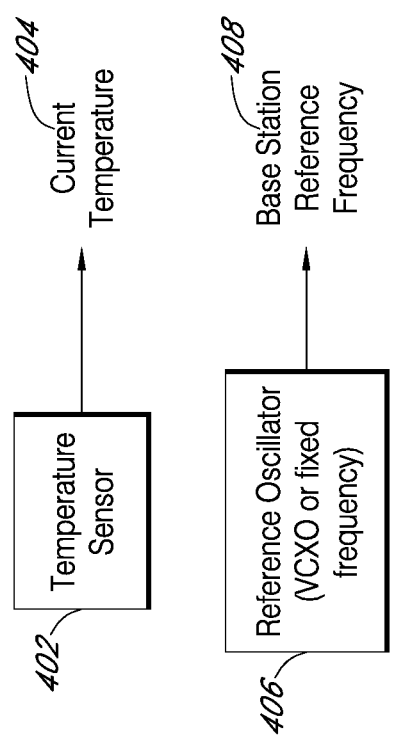
FIG. 4 illustrates a block diagram view of a temperature sensor and a reference oscillator in a base station in accordance with an embodiment of the present invention.

FIG. 4 illustrates a block diagram view of a temperature sensor 402 and a reference oscillator 406 in a base station (e.g., 102, 104, 106, and 108) in accordance with an embodiment of the present invention. Temperature sensor 402 may measure an ambient temperature of the base station device or may measure the temperature of the reference oscillator directly. Temperature sensor 402 may employ any common sensing technology including analog temperature sensing, digital sensing, contact/non-contact sensing, etc. In an embodiment, temperature sensor 402 is placed in close proximity to or is collocated with the reference oscillator 406 for accurate readings of the reference oscillator temperature. In operation, the temperature sensor 402 senses the temperature of the reference oscillator 406 and outputs a current temperature 404, while the reference oscillator 406 outputs a base station reference frequency 408 for use in wireless communications.

Figure 5:
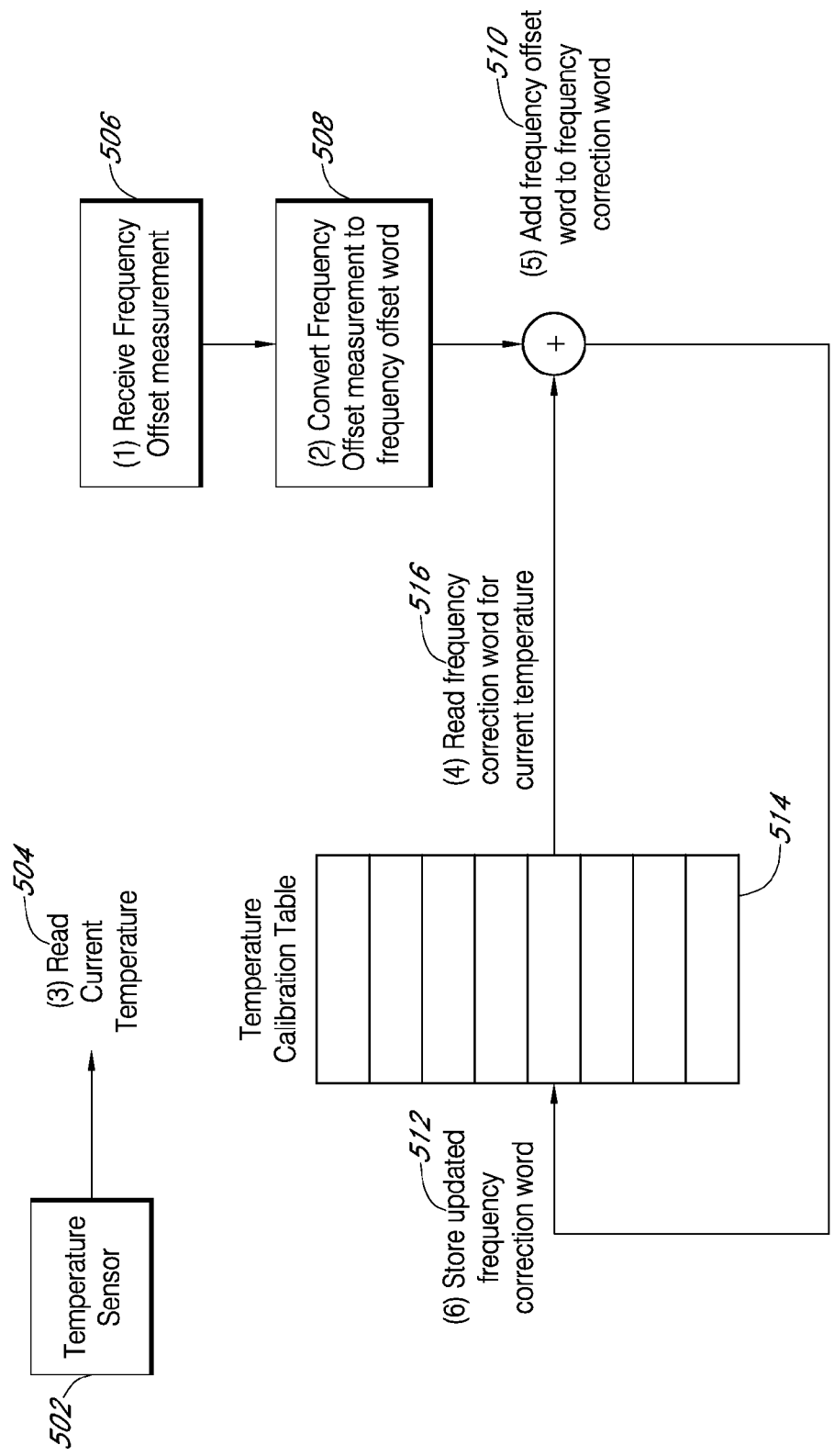
FIG. 5 illustrates a block diagram of a temperature calibration table and a process of updating the calibration table in accordance with an embodiment of the present invention.

FIG. 5 illustrates a block diagram of a temperature calibration table 514 and a process of updating the calibration table in accordance with an embodiment of the present invention. Temperature calibration table 514 may be stored in a non-volatile memory such as flash or EEPROM, in each femtocell base station (e.g., 104, 106, and 108). Generally, the calibration table stores a value used in calibrating a reference frequency such as the reference oscillator 406 in FIG. 4. Additionally, the values in calibration table 514 are used in conjunction with the temperature sensor 502 in calibrating the base station (e.g., 104, 106, and 108). Thus, the calibration table 514 includes temperature and frequency offset information. When the transmit frequency drifts as the ambient temperature of the base station changes, the frequency correction values stored in the calibration table 514 are used to maintain an accurate transmit frequency by making changes to the reference oscillator frequency as the temperature changes. Further, an accurate transmit frequency is also obtained at power-on of the base station by reading values from the calibration table 514 which may be stored in a non-volatile memory (e.g., memory 204 and 226 of FIG. 2). The calibration table 514 may include data in a variety of formats, but is not limited to: a list of frequency correction words with one word for every degree Celsius, degree Fahrenheit, or some other temperature increment; or a set of coefficients for a polynomial from which a frequency correction word can be calculated, when given the temperature.

In one embodiment of the invention, the contents of the temperature calibration table 514 are initially set to a default set of values, such as all zeros, or some other nominal set of temperature calibration values. This initialization of the temperature calibration table may occur when the base station (e.g., 104, 106, and 108) is manufactured or at the first time the base station is powered on. In one embodiment, after this initialization the temperature calibration table 514 is not normally reinitialized to its default state, other than through a reset function, typically initiated by a network operator. In another embodiment, the reference correction feedback processes are performed under normal operating conditions and not as a step in a calibration test process.

The process of updating the calibration table will be described generally by way of examples in FIGS. 5, 6 and 7. It should be understood that this process could be executed using one or more computer-executable programs stored on one or more computer-readable media located on any one of the base station devices (e.g., 104, 106, and 108), or collaboratively on the network base station 102, or in the radio resource manager 116 in FIG. 1. In block 506, a base station device (e.g., 104, 106, and 108) receives a frequency offset measurement. This frequency offset measurement is a difference between the current transmit frequency of a base station (e.g., reference frequency 408 in base station 104, 106, and 108) and the transmit frequency of a base station with a high accuracy frequency reference (e.g., a macrocell 102). By way of example, the process of generating a frequency offset begins with a subscriber device that is receiving signals from a first base station with a high accuracy frequency reference (e.g. 102) and a second base station with a lower accuracy frequency reference (e.g., 104, 106, and 108). The subscriber device measures a high accuracy transmit frequency signal derived from the high accuracy frequency reference in a downlink communication from the first base station device. Next, the subscriber device measures a transmit frequency of the second base station (e.g., a transmit frequency derived from reference frequency 408). The subscriber device may determine the difference between the two transmit frequencies to determine a frequency offset measurement. In another embodiment, the subscriber device may directly or indirectly send the received measurements to a base station or RRM 116 where the base station or RRM 116 determines a frequency offset measurement.

After a frequency offset is determined, a RRM 116 may determine and send a frequency correction instruction to the second base station with the low-accuracy reference frequency. Alternatively, the second base station may receive only the frequency offset measurement rather than a frequency correction instruction.

Next, at block 508 the frequency offset measurement is converted to a frequency offset word. This formats the frequency offset measurement data to be used in the base station's calibration process. At an earlier time, concurrently, or after the block 508 has executed, a temperature sensor 502 measures the current operating temperature of the reference oscillator (e.g., 406). Thus, the current temperature is read at block 504. At block 516, a frequency correction word corresponding to the current temperature is read from the temperature calibration table 514. Alternatively the frequency correction word may be calculated from the temperature calibration table coefficients in block 516. Next, at block 510, the frequency offset word converted in block 508 is added to the frequency correction word extracted from the temperature calibration table in block 516. The result of block 510 is an updated frequency correction word. This updated frequency correction word is stored in the temperature calibration table in block 512.

Figure 6:
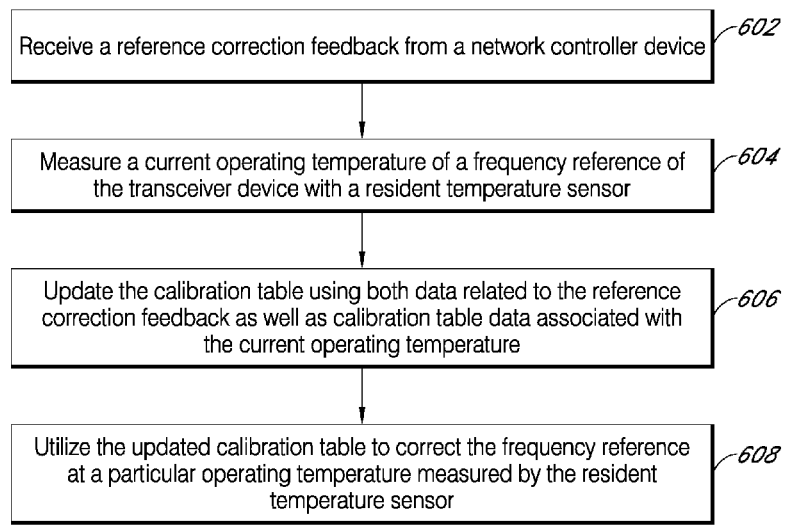
FIG. 6 illustrates a flow diagram of updating a calibration table to correct a frequency reference in accordance with an embodiment of the present invention.

FIG. 6 illustrates a flow diagram of updating a calibration table to correct a frequency reference in accordance with an embodiment of the present invention. FIG. 6 illustrates a process similar to FIG. 5 but helps illustrate and clarify the timing of the process while highlighting the fact that the order and number of steps may change and still be within the scope of the invention. Again, it should be understood that this process could be executed using one or more computer-executable programs stored on one or more computer-readable media located on any one of the base station devices (e.g., 104, 106, and 108), or collaboratively on the network base station 102, or in the radio resource manager 116 in FIG. 1. At block 602 a base station device (e.g., 104, 106, and 108) receives a reference correction feedback from a network controller device (e.g., via network interface circuit 228). At block 604, the base station device (e.g., 104, 106, and 108) measures a current operating temperature of a frequency reference of the base station device with a resident temperature sensor. In one embodiment, the frequency reference is a local oscillator of the base station, such as a voltage controlled oscillator, or a fixed frequency oscillator. In another embodiment, the resident temperature sensor may represent temperature sensor 402 in FIG. 4.

At block 606, the base station device (e.g., 104, 106, 108, and 200) updates the calibration table using the data related to the reference feedback (received in block 602) as well as the calibration table data associated with the current operating temperature. In one embodiment, this step 606 presupposes that there is calibration table data associated with the current operating temperature, i.e., that this process may have been performed previously and the base station is refining the calibration data. Examples of updating may include, but are not limited to: averaging the received reference correction feedback with the previously stored values; replacing the previously stored values with the current received reference correction feedback; etc. More sophisticated algorithms can also be used to decide when to store the updated reference correction feedback. For example, to protect against large errors in the estimation of the frequency offset by customer premise equipment (CPE) (e.g., a subscriber device or a base station device), an algorithm may detect erroneous values. If a large frequency offset measurement is received in block 602 then the base station may not immediately store the updated reference correction feedback and may rather only adjust the frequency reference (e.g., block 608). When the base station receives a subsequent frequency offset measurement that indicates that the frequency offset is indeed smaller, the base station may have more confidence that the latest frequency offset is more accurate for the current operating temperature. When the base station has more confidence that the reference correction feedback in not erroneous, the base station will update the calibration table with the data (e.g., block 606).

Next, at block 608 the base station utilizes the updated calibration table to correct the frequency reference at a particular operating temperature measured by the resident temperature sensor. In one embodiment, the base station will adjust the reference frequency according to the modulation units in either FIG. 8 or FIG. 9.

Figure 7:
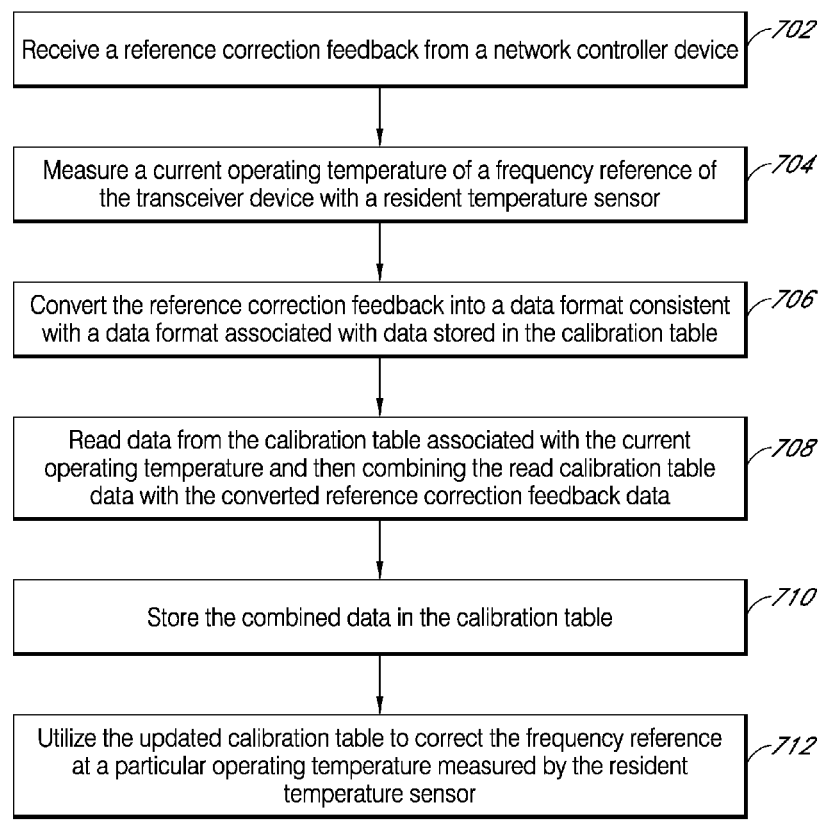
FIG. 7 illustrates a flow diagram of updating a calibration table to correct a frequency reference in accordance with an embodiment of the present invention.

FIG. 7 illustrates a flow diagram of updating a calibration table to correct a frequency reference in accordance with an embodiment of the present invention. Again, it should be understood that this process could be executed using one or more computer-executable programs stored on one or more computer-readable media located on any one of the base station devices (e.g., 104, 106, and 108), or collaboratively on the network base station 102, or in the radio resource manager 116 in FIG. 1. At block 702 a base station device (e.g., 104, 106, and 108) receives a reference correction feedback from a network controller device (e.g., network interface circuit 228). At block 704, the base station device (e.g., 104, 106, and 108) measures a current operating temperature of a frequency reference of the base station with a resident temperature sensor. In one embodiment, the operation in blocks 702 and 704 correspond to the operation in blocks 602 and 604.

Next, at block 706 the reference correction feedback received in block 702 is converted into a data format consistent with a data format associated with data stored in the calibration table. In once embodiment, the reference correction feedback is converted into a word (e.g., a fixed size group of bits that is processed by the base station device). At block 708, the base station reads data from the calibration table associated with the current operating temperature and then combines the read calibration table data with the converted reference correction feedback data. Different calculations may take place during step block 708. In one embodiment, a fraction of the frequency offset word may be added to the frequency correction word in order to reduce the noise on the frequency offset measurement. In another embodiment where the temperature calibration table 514 comprises coefficients used to calculate the frequency correction word, the coefficients can be updated by a least squares method, Chebyshev polynomial approximation, interpolation polynomial, or any other such method as appropriate.

At block 710, the base station stores the data combined in block 708 in the calibration table. Finally, at block 712, the base station utilizes the updated calibration table to correct the frequency reference at a particular operating temperature measured by the resident temperature. This step may include applying a frequency correction to a voltage controlled oscillator in FIG. 8 or may include applying a frequency correction to a direct digital synthesis and interpolation circuit in FIG. 9.

Figure 8:
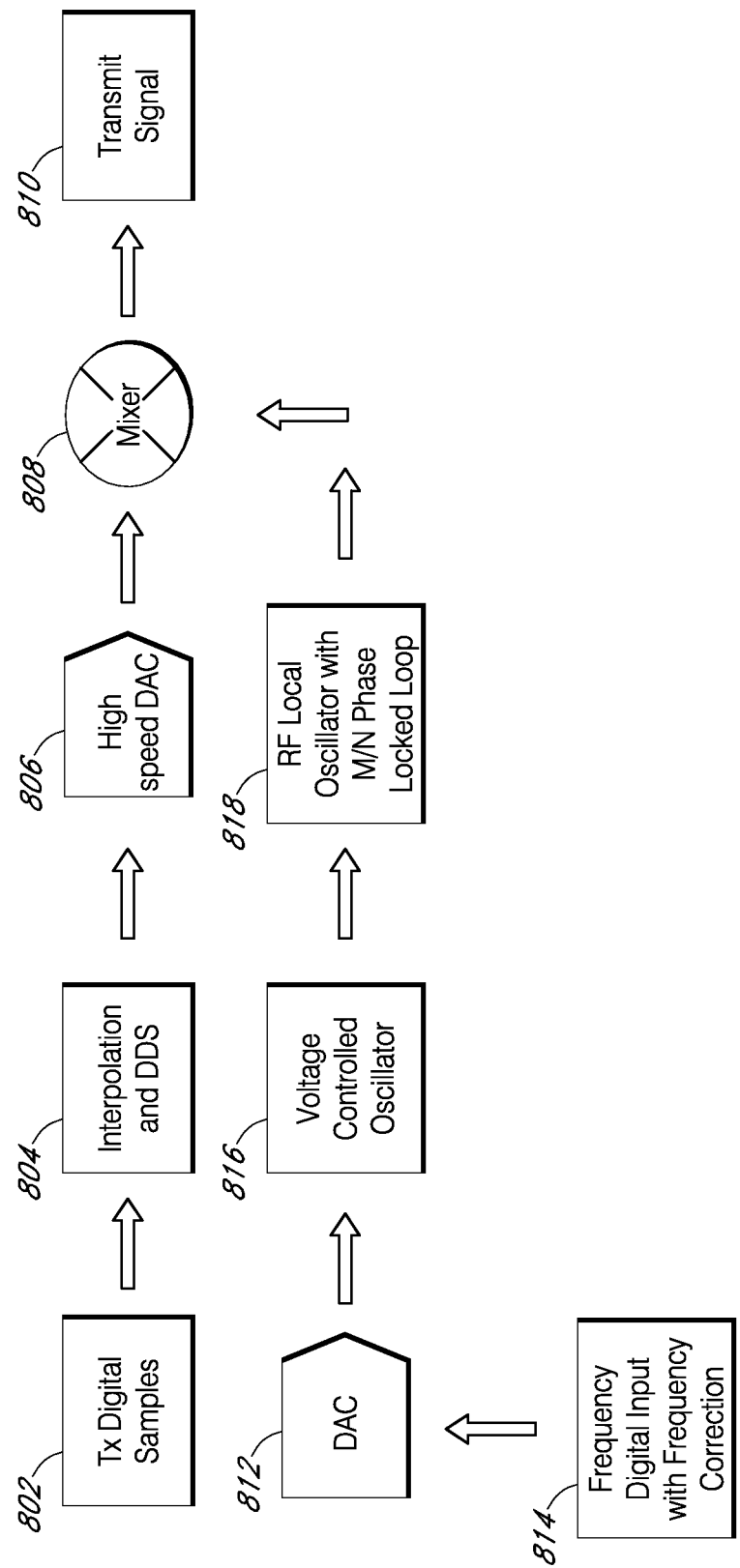
FIG. 8 illustrates a block diagram of a modulation unit for correcting a frequency using input to a voltage controlled oscillator in accordance with an embodiment of the present invention.

FIG. 8 illustrates a block diagram of a modulation unit for correcting a frequency using input to a voltage-controlled oscillator in accordance with an embodiment of the present invention. In one embodiment, the modulation unit may be found in the upconverter 208 of the base station device 200 in FIG. 2. Generally, the modulation unit may receive transmission data, synchronization data, and frequency correction information as inputs in order to generate a transmit signal as an output. Specifically, the modulation unit receives transmission data as Tx Digital Samples 802 and passes the samples 802 to the Interpolation and Direction Digital Synthesis (DDS) Unit 804. Along with interpolation, which inserts samples in between two existing samples in a predetermined fashion (e.g., linearly) and at predetermined intervals (e.g., one sample equally spaced between two existing samples), the direct digital synthesis performed by the Interpolation and DDS unit 804 formats and inputs the data into the High Speed Digital-to-Analog Converter (DAC) 806. The analog signal generated by the High Speed DAC 806 is mixed at the mixer 808 with a carrier frequency generated by Local Oscillator Unit 818 to generate a transmit signal 810. Thus, components 802, 804, and 806 comprise a first operating path in the modulation unit.

A second operating path in modulation unit begins with a frequency digital input with frequency correction unit 814. This frequency correction unit 814 may perform a variety of functions, including but not limited to, any of the processes illustrated in FIGS. 5, 6 and 7. In one embodiment, the frequency correction unit 814 inputs a frequency correction value stored in the calibration table 514. Data from the frequency correction unit 814 may pass through digital-to-analog converter (DAC) 812 before being input to a voltage controlled oscillator (VCXO) 816. In one embodiment, the VCXO 816 may correspond to the reference oscillator 406 of FIG. 4, while the output of the VCXO 816 may correspond to the base station reference frequency 408. In this manner the VCXO 816 is algorithmically controlled so that different values applied to the DAC 812 adjust the oscillator frequency of VCXO 816, which in turn adjusts the carrier frequency generated by the Radio Frequency Local Oscillator Unit with M/N Phase Locked Loop (PLL) 818. The carrier frequency generated by the second operating path (i.e., with components 814, 812, 816, and 818) is mixed with the analog signal generated by the first operating path in the mixer 808 to generate the transmit signal 810. The transmit signal may be sent to the transmit amplifier 206 and antenna 212 of FIG. 2 for wireless transmission.

Figure 9:
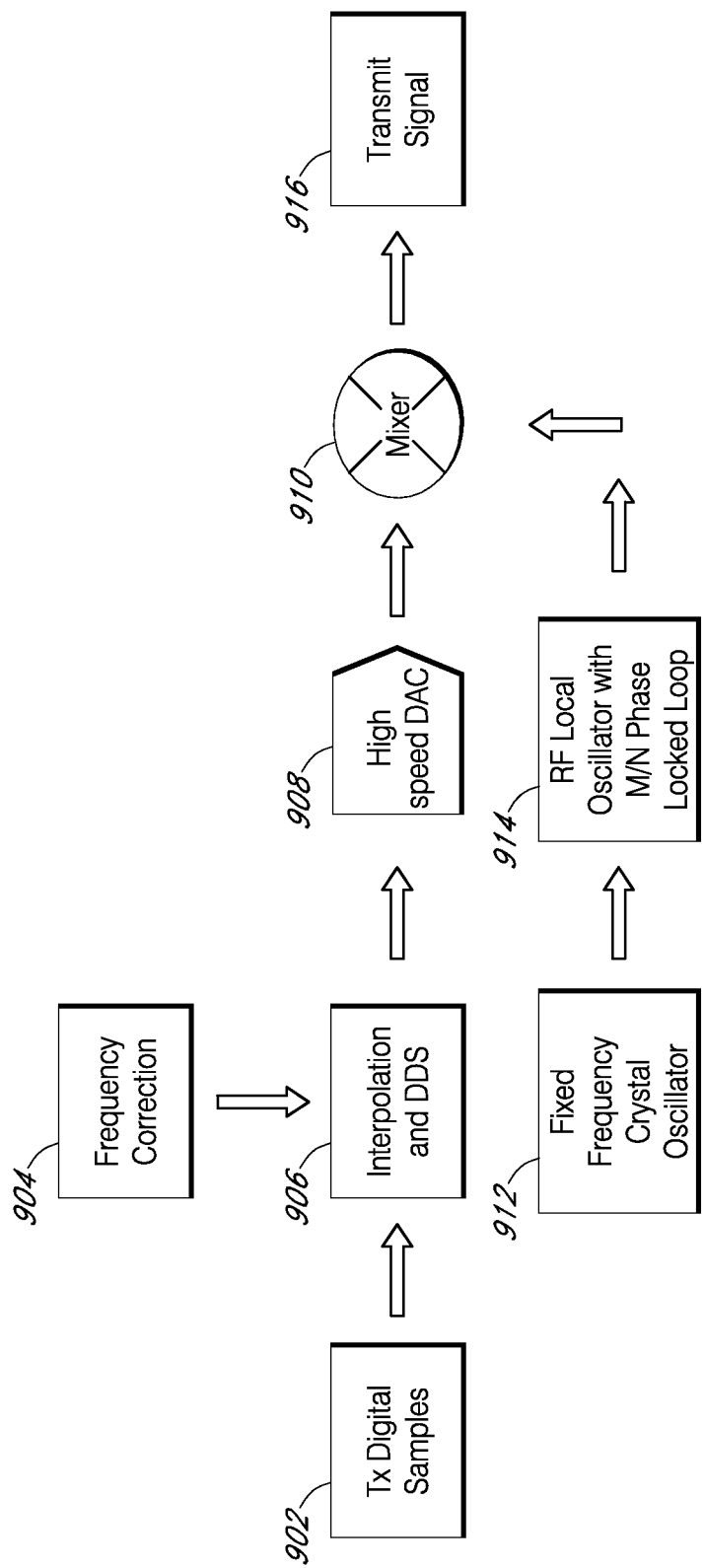
FIG. 9 illustrates a block diagram of a modulation unit for correcting a frequency using direct digital synthesis in accordance with an embodiment of the present invention.

FIG. 9 illustrates a block diagram of a modulation unit for correcting a frequency using direct digital synthesis in accordance with an embodiment of the present invention. In one embodiment, the modulation unit may be found in the upconverter 208 of the base station device 200 in FIG. 2. Similar to the modulation unit illustrated in FIG. 8, the modulation in FIG. 9 may receive transmission data, synchronization data, and frequency correction information as inputs in order to generate a transmit signal as an output. FIG. 9 is distinguished from the modulation unit in FIG. 8 because FIG. 9 uses a fixed frequency crystal oscillator rather than a voltage controlled oscillator.

To generate a local oscillator frequency (e.g., 408), the radio frequency local oscillator with M/N phase locked loop 914 is driven by a fixed frequency crystal oscillator 912. In accordance with an embodiment of the invention, the fixed frequency oscillator 912 may be a lower-cost oscillator, and the oscillator 912 may encounter temperature based frequency variations. To compensate for the drifting local oscillator frequency, which is derived from the fixed frequency oscillator, Tx digital samples 902 representing the data to be modulated and a frequency correction 904 are combined in the interpolation and direct digital synthesis unit 906 to generate a digital waveform. Along with interpolation, which inserts samples in between two existing samples in a predetermined fashion (e.g. linearly) and at predetermined intervals (e.g. one sample equally spaced between two existing samples), the direct digital synthesis performed by the interpolation and DDS subcomponent 906 formats the data in a way that can be fed into the high speed digital-to-analog converter (DAC) 908. The high speed DAC 908 converts the digital waveform including the frequency correction and the data to be transmitted into an analog waveform to be mixed by the mixer 910 with the signal from the RF local oscillator 914. The output of the mixer 910 is a transmit signal 916 may be sent to the transmit amplifier 206 and antenna 212 of FIG. 2 for wireless transmission.

In one embodiment, the transmit signal 916 is a modulated signal with a carrier frequency or center frequency that is either the sum or difference of the RF local oscillator 914 frequency and the center frequency of the analog waveform from the DAC 908. In the modulation of FIG. 9, the frequency correction information 904 is input into the interpolation and DDS unit 906. The frequency correction information 904 is used to determine the frequency of the digital waveform generated by the interpolation and DDS unit 906. When the frequency-corrected digital waveform is converted by the DAC 908, the resulting signal from the mixer has been adjusted for any frequency drift caused by temperature variations. In one embodiment, the frequency correction information 904 is based on, but is not limited to: values sent from RRM 116 to a base station (e.g., 104, 106, and 108); a frequency difference measured by a subscriber device (e.g., 110, 112, and 114); and/or values stored in the calibration table 514.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A system, comprising:
   a first base station having a first frequency reference unit, a temperature sensor, and a memory having a calibration table stored therein;
   a second base station having a second frequency reference unit; and
   a network controller device configured to manage radio resources of the first and second base stations, the network controller device configured to receive frequency information from a subscriber device, the frequency information being based on a first measurement of a first transmit frequency of the first base station and a second measurement of a second transmit frequency of the second base station,
   wherein the first base station is configured to:
   receive reference correction feedback from the network controller device, the reference correction feedback being based on the frequency information received from the subscriber device;
   measure a first operating temperature with the temperature sensor;
   update the calibration table using data associated with the reference correction feedback and calibration table data associated with the first operating temperature; and
   correct the first frequency reference unit of the first base station using the updated calibration table.

2. The system of claim 1, wherein the reference correction feedback relates to an offset measurement determined by taking a difference between the first transmit frequency of the first base station and the second transmit frequency of the second base station, and
   wherein the first and second reference units are first and second reference oscillators, respectively, the second reference oscillator being configured to operate with a less drift from a desired frequency than the first reference oscillator.

3. The system of claim 2, wherein updating the calibration table includes converting the reference correction feedback into a data format consistent with a data format associated with data stored in the calibration table.

4. The system of claim 3, wherein updating the calibration table further includes reading data from the calibration table associated with the first operating temperature and combining the read calibration table data with the converted reference correction feedback data.

5. The system of claim 4, wherein updating the calibration table further includes storing the combined data in the calibration table, and
   wherein the network controller device is a server that is located at a different location from the first base station.

6. The system of claim 1, wherein the first frequency reference unit and the temperature sensor are collocated within the first base station, such that the first operating temperature of the first frequency unit is accurately determined by the temperature sensor.

7. The system of claim 6, wherein the updated calibration table is utilized by the first base station to correct the first frequency reference unit at a second operating temperature measured by the temperature sensor.

8. The system of claim 2, wherein the first base station has a smaller coverage area than that of the second base station.

9. The system of claim 8, wherein the first base station is picocell or femtocell, and the second base station is a macrocell, and
   wherein the network controller device is a server that is located at a different location from the first base station.

10. A non-transitory computer-readable medium encoded with computer-executable instructions for updating a calibration table in a base station, which when executed, performs operations, the operations comprising:
    receiving, at a network controller device, frequency information from a subscriber device, the frequency information being based on a first measurement of a first transmit frequency of a first base station and a second measurement of a second transmit frequency of a second base station, the network controller device being configured to manage radio resources of the first and second base stations;

providing, by the network controller device, reference correction feedback to the first base station by the network controller device, the reference correction feedback being based on the frequency information received from the subscriber device;

measuring a first operating temperature of a first frequency reference unit of the first base station with a temperature sensor provided within the first base station;

updating a calibration table of the first base station using data associated with the reference correction feedback and calibration table data associated with the first operating temperature; and correcting the first frequency reference unit of the first base station using the updated calibration table of the first base station.

11. The non-transitory computer-readable medium of claim 10, wherein updating the calibration table of the first base station includes converting the reference correction feedback into a data format consistent with a data format associated with data stored in the calibration table of the first base station.

12. The non-transitory computer-readable medium of claim 11, wherein updating the calibration table of the first base station further includes:
reading data from the calibration table of the first base station associated with the first operating temperature;
combining the read calibration table data with the converted reference correction feedback data; and
storing the combined data in the calibration table of the first base station.

13. The non-transitory computer-readable medium of claim 10, wherein receiving the reference correction feedback is performed at a predetermined interval during an operation of the first base station.

14. The non-transitory computer-readable medium of claim 10, wherein the first frequency reference unit and the temperature sensor are collocated within the first base station, such that the operating temperature of the first frequency reference unit is accurately determined by the temperature sensor.

15. The non-transitory computer-readable medium of claim 10, wherein the updated calibration table of the first base station is utilized to correct the first frequency reference unit at a second operating temperature measured by the temperature sensor.

16. A computer-implemented method for updating a calibration table in a base station, the method comprising:
receiving, at a network controller device, frequency information from a subscriber device, the frequency information being based on a first measurement of a first transmit frequency of a first base station and a second measurement of a second transmit frequency of a second base station;

providing, by the network controller device, reference correction feedback to the first base station, the reference correction feedback being based on the frequency information received from the subscriber device;

measuring a first operating temperature of a first frequency reference unit of the first base station with a temperature sensor provided within the first base station;

updating a calibration table of the first base station using data related to the reference correction feedback and calibration table data associated with the first operating temperature, the calibration table of the first base station being stored within a non-transitory computer readable medium within the first base station; and correcting the first frequency reference unit of the first base station using the updated calibration table of the first base station.

17. The computer-implemented method of claim 16, wherein the reference correction feedback relates to an offset measurement determined by taking a difference between the first transmit frequency of the first base station and the second transmit frequency of the second base station, and
wherein the first and second reference units are first and second reference oscillators, respectively, the second reference oscillator being configured to operate with a less drift from a desired frequency than the first reference oscillator.

18. The computer-implemented method of claim 17, wherein updating the calibration table of the first base station includes converting the reference correction feedback into a data format consistent with a data format associated with data stored in the calibration table of the first base station.

19. The computer-implemented method of claim 18, wherein updating the calibration table of the first base station further includes reading data from the calibration table of the first base station associated with the first operating temperature and combining the read calibration table data with the converted reference correction feedback data.

20. The computer-implemented method of claim 19, wherein updating the calibration table of the first base station further includes storing the combined data in the calibration table of the first base station.

21. The computer-implemented method of claim 16, wherein the updated calibration table of the first base station is utilized to correct the first frequency reference unit at a second operating temperature measured by the temperature sensor.

* * * * *